United States Patent
Gat et al.

(10) Patent No.: US 7,447,358 B2
(45) Date of Patent: Nov. 4, 2008

(54) IMAGE SEGMENTATION USING BRANCH AND BOUND ANALYSIS

(75) Inventors: Yoram Gat, Palo Alto, CA (US); Horst W. Haussecker, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 954 days.

(21) Appl. No.: 10/815,896

(22) Filed: Mar. 31, 2004

(65) Prior Publication Data
US 2005/0226493 A1 Oct. 13, 2005

(51) Int. Cl.
*G06K 9/00* (2006.01)
*G06K 9/34* (2006.01)
*H04N 5/225* (2006.01)

(52) U.S. Cl. .............. 382/173; 382/145; 382/180; 348/207.1; 348/207.11

(58) Field of Classification Search ......... 382/145–147, 382/164, 171, 173–180, 209, 321, 324; 358/462, 358/453, 538; 348/207.1, 207.11
See application file for complete search history.

(56) References Cited

U.S. PATENT DOCUMENTS

| | | | | | |
|---|---|---|---|---|---|
| 5,302,836 | A | * | 4/1994 | Siu | 250/559.34 |
| 5,787,194 | A | * | 7/1998 | Yair | 382/173 |
| 5,966,140 | A | * | 10/1999 | Popovic et al. | 345/441 |
| 6,298,151 | B1 | * | 10/2001 | Jodoin et al. | 382/176 |
| 6,473,517 | B1 | * | 10/2002 | Tyan et al. | 382/105 |
| 6,535,632 | B1 | * | 3/2003 | Park et al. | 382/164 |
| 7,031,491 | B1 | * | 4/2006 | Donescu et al. | 382/100 |
| 7,203,360 | B2 | * | 4/2007 | Lee et al. | 382/173 |
| 2002/0081833 | A1 | * | 6/2002 | Li et al. | 438/622 |
| 2003/0048936 | A1 | * | 3/2003 | Fan et al. | 382/131 |
| 2004/0240707 | A1 | * | 12/2004 | Aliaga et al. | 382/103 |

OTHER PUBLICATIONS

Gat ("A branch-and-bound technique for nano-structure image segmentation," IEEE Proc. 2003 Conference on CVPR Workshop, Jun. 2003, pp. 1-6.*

Hansen et al. ("Relaxation Methods for Supervised Image Segmentation," IEEE Tranc. PAMI, vol. 19, No. 9, Sep. 1997, pp. 949-962).*

Tang et al. ("Geometric model-based segmentation of the prostate and surrounding structures for image guided radiotherapy," Visual Communications and Image Processing 2004, SPIE vol. 5308 (2004), pp. 168-176).*

(Continued)

*Primary Examiner*—Yubin Hung
(74) *Attorney, Agent, or Firm*—Blakely, Sokoloff, Taylor & Zafman LLP

(57) ABSTRACT

According to an embodiment of the invention, a method and apparatus for image segmentation are described. An embodiment of a method comprises inserting a state comprising a set of image segmentations into a queue, the queue being ordered by priority, the set of image segmentations having a priority representing a bound for a quality of the segmentations; extracting the state in the queue having the highest priority; if the extracted state is a terminal state, halting and outputting the extracted state as a solution; if the extracted state is not a terminal state refining the extracted state into a plurality of sets of segmentations, each of the plurality of sets having a priority, inserting the plurality of sets of segmentations into the queue, and iteratively repeating the extraction of the state in the queue having the highest priority.

24 Claims, 6 Drawing Sheets

OTHER PUBLICATIONS

Gat, Yoram "A Branch-and-bound Technique for Nano-structure Image Segmentation", *IEEE Proceedings of the 2003 Conference on Computer Vision and Pattern Recognition Workshop (CVPRW'03)*, 2003, 6 pgs.

* cited by examiner

Image 110

Image and Noise 120

IMAGE SEGMENTATION USING BRANCH AND BOUND ANALYSIS

FIELD

An embodiment of the invention relates to imaging in general, and more specifically to image segmentation using branch and bound analysis.

BACKGROUND

In modern technology, particularly in electronics, devices are moving to smaller and smaller structures, which may be referred to as nano-structures. It is expected that further reductions in scale will continue to be developed in the future. For example, microelectronic devices have been greatly reduced in size, thereby reducing the size of structures such as the wire connections in microelectronic devices.

The reduction in device size has created new challenges for imaging of devices. Imaging of structures may be required for many purposes, including analysis and debugging of manufactured devices. As the devices are reduced in size, structures within the devices may become small enough that conventional imaging techniques are insufficient, thereby complicating the process of device analysis.

In particular, noise becomes a significant factor in the imaging of small structures. The noise levels that are present in images of extremely small structures may be very high. Noise levels are a problem that will intensify as the structures are subject to further miniaturization.

As a result of high noise levels, difficulties may arise in correctly interpreting what can be seen in images of nano-structures. In particular, the analysis and debugging of microelectronic devices becomes more challenging as the noise in the images overwhelms the structures in images, making it increasingly difficult to discern what is and is not shown in an image.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
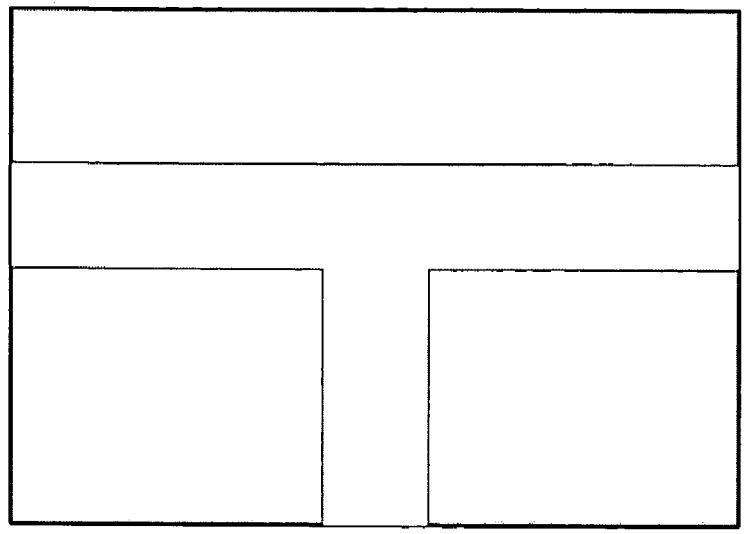
FIG. 1 illustrates an embodiment of a structure subjected to imaging.
Figure 1:
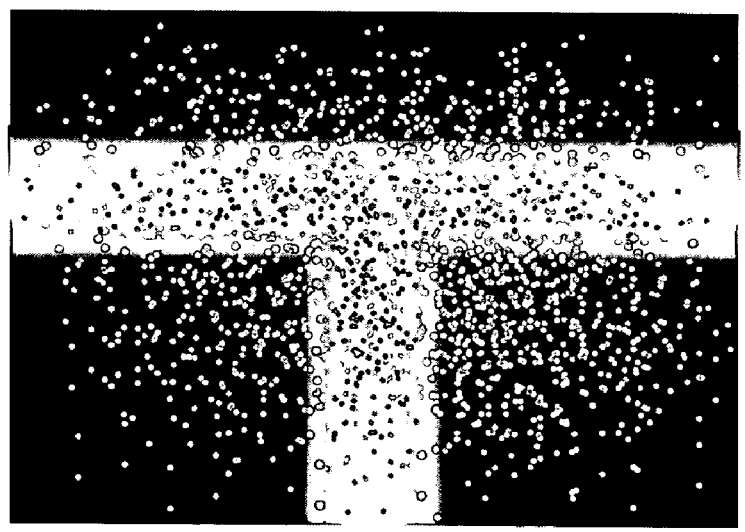

A method and apparatus are described for image segmentation using brand and bound analysis.

Before describing an exemplary environment in which various embodiments of the present invention may be implemented, some terms that will be used throughout this application will briefly be defined:

As used herein, "nano-structure" means a small structure of any kind. The term includes, for example, a microelectronic structure.

As used herein "segmentation" means separation of an image into segments.

According to an embodiment of the invention, a large number of possible segmentations of an image are considered using an objective function to determine which segmentation maximizes a criterion. The set of possible segmentations and the objective function are specified to meet the conditions of the particular situation.

Under an embodiment of the invention, an algorithm is utilized to explore a space of segmentations of an image using a branch-and-bound technique. The algorithm eliminates the portions of the segmentation space that are proved to be poor candidates and explores in further detail the more promising portions of the segmentation space.

Under an embodiment of the invention, an image is segmented using a model of the observed structure. In the embodiment, the shape properties of the segmentations are defined and, among all segmentations with such shape properties, the segmentation that maximizes an explicit homogeneity criterion is obtained. For example, in an image that provides a lighter colored structure against a darker background, the segmentation that maximizes homogeneity for dark and light regions of the device in relation to the geometric model of the structure is obtained.

In one simple example, a straight-line segmentation of an image into two regions may be utilized to minimize the intensity variation within the regions. In this example, any segmentation divides the image into a first region and a second region. The segmentation that will best fit the image will fit the model and contain a minimal intensity variation in the first region and the second region.

In one example, an image may be taken of a wire or other metal portion on a background, such as a silicon wafer substrate. The wire generally will generate more intense reflection than the silicon. However, in microelectronics, the structures will be extremely small and a large amount of noise may exist in the image. For this reason, it may be difficult to correctly interpret what is contained in the image. Under an embodiment of the function, certain expected wire geometries may be used to form models, and segmentations of the image may be based upon these models. Under an embodiment of the invention, a function will provide a higher priority to segmentations that result in an area of high intensity pixels in a background of low intensity pixels, which would represent a wire set against the silicon. The set of possible segmentations reflects what is known about the geometry of the wire, thus what is included in the model for the wire.

FIG. 1 illustrates an embodiment of a structure subjected to imaging. FIG. 1 contains a simplified model for purposes of explanation. FIG. 1 shows a particular wire structure 110 that is present in a microelectronic device and an image of this device with noise 120. In this illustration, the structure is intended to represent a wire with a T-junction, with the lighter colored wire being presented on a darker silicon background. In actual images, the noise level for the image may be high and the structure may be much more difficult to discern. Under an embodiment of the invention, the image 120 is segmented according to models of structures. In this example, the structure is segmented according to geometric models of wiring structures that are expected to found in the image.

Figure 2:
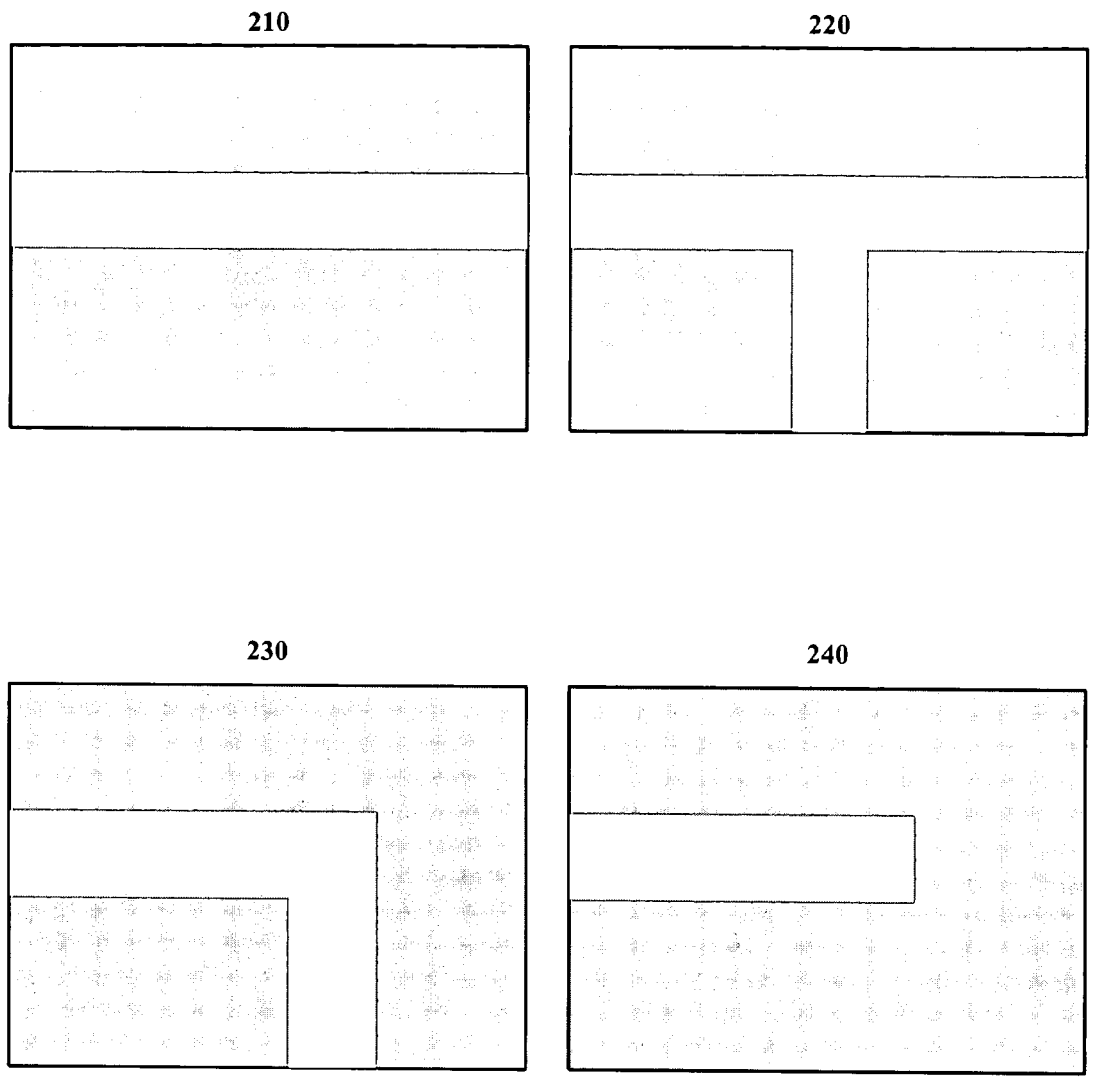
FIG. 2 illustrates embodiments of models that may be used in imaging.

FIG. 2 illustrates embodiments of models that may be used in imaging. In this particular example, the models are geometric models that represent wires on a silicon background, but embodiments of the invention are not limited to any particular type of structure or model. In FIG. 2, the models shown are of a wire 210, a wire with a T-junction 220, a wire corner 230, and a wire tip 240. These models presented here are only certain examples of models that may be used in a wiring environment. Each model may be rotated or reflected to form other variations. Each geometric model then may be used to produce many segmentations of an image.

Figure 3:
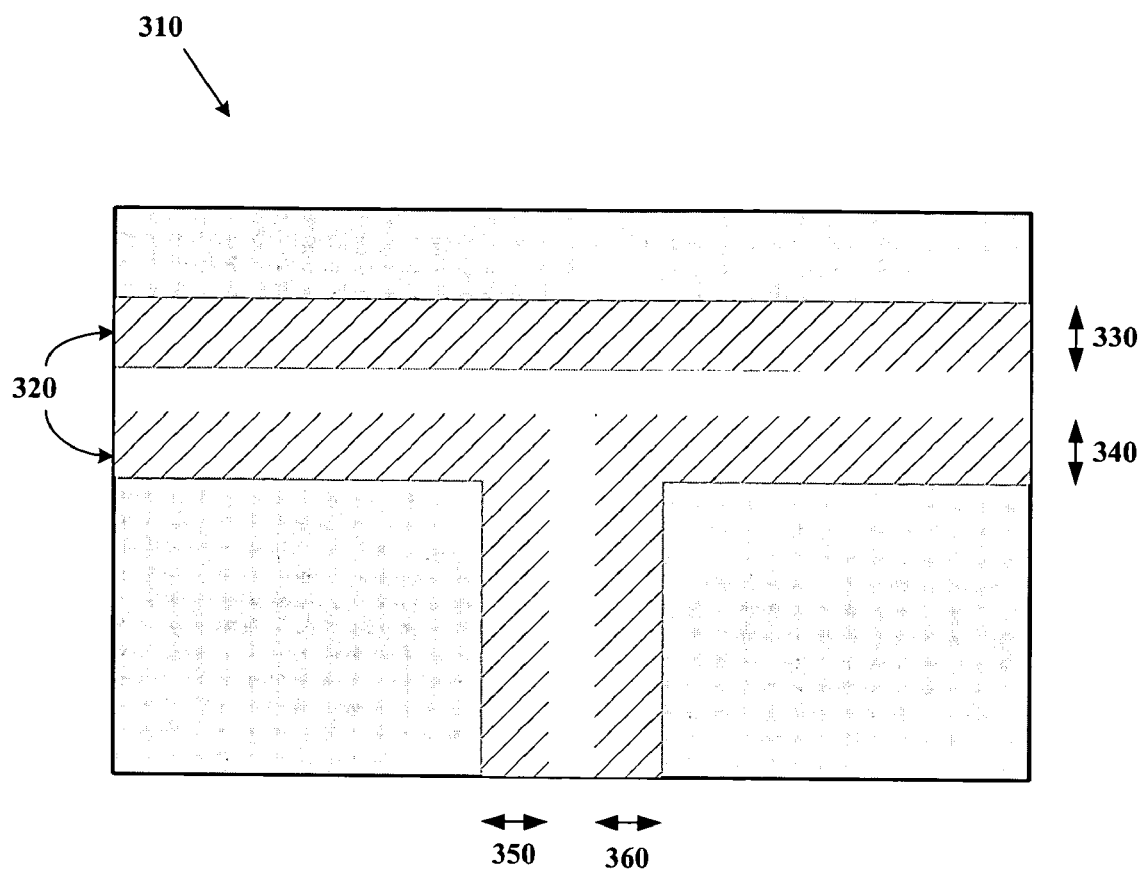
FIG. 3 illustrates an embodiment of an image with possible segmentations.

FIG. 3 illustrates an embodiment of an image with possible segmentations. In this illustration, the image is of a T-junction 310, which is a possible wire structure that may be found in a microelectronic device. The segmentations in this illustration are based on a geometric model of a T-junction. The illustrated segmentations differ based on how the segmentations will allocate certain pixels, such pixels being in the indicated cross-hatched area 320. In this illustration, the segmentations vary according to four parameters, although the number of parameters will vary depending on the circumstances. In this illustration, the parameters are the position of the top horizontal line 330, the position of the bottom horizontal line 340, the position of the left vertical line 350, and the position of the right vertical line 360. However, the segmentations agree on many of the pixels. For the segmentations that are shown in FIG. 3, these pixels are the pixels that are outside of area 320. It is possible to determine, based on the pixels on which the segmentations agree, that all of the segmentations in the range being considered will generate no more than a certain maximum contrast.

Under an embodiment of the invention, in order to consider a large set of segmentations (which, in theory, can approach infinity) in a reasonable amount of time, bounds are implemented. Each segmentation has a certain quality relating to the image. For example, the quality of a given segmentation may represent the homogeneity of dark and light regions of the image as the image is divided by the segmentation. For any set of segmentations, the bound associated with the set is a number that is guaranteed to be at least as high as the quality of the best segmentation in the set. In one example, for a set of possible segmentations that have some similarities, it is possible to evaluate a bound for the quality of the segmentation in the set. If the bound is low enough, the entire set may be eliminated without looking in detail at the individual segmentations in the set. This is accomplished by finding the pixels on which all of the segmentations in the set agree. The intensity of such pixels (although color or other characteristic may also be used) that are segmented in the same way by all the segmentations being considered can be used to calculate the range of possible contrasts between pixels that are inside and outside of the image structure, i.e., the pixels that are inside or outside the wire on a silicon background. Any segmentation in the set would result in a contrast in the range. Therefore, if the highest possible contrast of the set is low, the entire set of segmentations can be eliminated from consideration.

Under an embodiment of the invention, a branch and bound algorithm is used to search for an optimal segmentation of an image. The algorithm uses a priority queue to store states, with each state being a set of segmentations. Each state is either a terminal state or a non-terminal state. When a terminal state reaches the head of the queue, the search is terminated. States are designated as terminal according to a certain precision standard. All other states are non-terminal states. When a non-terminal state reaches the head of the queue, the state is removed from the queue, and new states that are subsets of the removed state are then inserted in the queue.

The states in the queue are prioritized by the bounds associated with them, and the state with the highest bound is placed at the head of the queue. For example, the priority may represent the contrast between the pixels inside a particular segment and the pixels outside the segment.

Under an embodiment of the invention, an image may be viewed as an array P of pixels in two-dimensions:

$$P=\{(i,j): i=1,\ldots n_x, j=1,\ldots n_y\}$$

Under an embodiment of the invention, each pixel p is associated with a scalar value. For example, $v(p)$ may represent the light intensity of the pixel p. Under another embodiment of the invention, $v(p)$ may represent a vector. For example, $v(p)$ may represent an RGB color vector or a filter response vector.

Under an embodiment of the invention, l is a segmentation loss function. The segmentation loss function scores each segmentation according to a fixed criterion:

$$l: S \to R$$

Under an embodiment of the invention, an algorithm finds a segmentation that maximizes the function l over the set of segmentations S. In one possible example, the function l may represent intensity homogeneity, and maximizing l results in maximizing the contrast between pixels inside of a segment and pixels outside of the segment.

under an embodiment of the function, a refining function R breaks up sets of segmentations into smaller sets by mapping a set of segmentations into a collection of sets of segmentations that form a partition of the original set. If a set S is a set of segmentations in the segmentation space S, then S is partitioned into sets:

$$\underline{S} \subseteq S$$

$$R: 2^S \to 2^{2^S}$$

$$\underline{S} \to \underline{S}_1, \underline{S}_2, \ldots, \underline{S}_I$$

Under an embodiment of the invention, a partial segmentation function M will provide the set of all the segments that a pixel may be mapped to by a set of segmentations:

$$M: 2^S \times P \to 2^{\{1,\ldots,K\}}$$

With P being the array or the set of all of the pixels in an image, for any pixel p and set of segmentations S, the function M may be expressed as:

$$M(\underline{S}, p)$$

Under an embodiment of the invention, a partial segmentation loss function exists such that:

$$B: (2^{\{1,\ldots,K\}})^P \to R$$

Under an embodiment of the invention, a function B maps a partial segmentation of the pixels in an image to a value. The value obtained is greater than or equal to all values associated with any segmentation that is consistent with the partial segmentation. In an example of image contrast, this means that the value is greater than or equal to, or thus that the image contrast is greater than or equal to, any segmentation including the partial segmentation.

Under an embodiment of the invention, states are subsets of a segmentation space S. For any non-terminal state, the states that are immediately reachable from S are given by R(S), which is the refinement of the segmentation set S into smaller segmentation sets. Using the functions provided above and assuming a partial segmentation T is defined by $T(p)=M(\underline{S},p)$, representing the segments that p may be mapped to, the priority function L:

$$L: 2^S \to R$$

may be defined as:

$$L(S) = B(T)$$

In this equation, the function L provides a bound for any segment that is an element of the set that is the argument.

Under an embodiment of the invention, an optimization process for a segmentation of an image may be expressed as follows:

(1) Initialization of Process—The process is begun with an empty priority queue. The state S for the set of all segmentations is inserted into the priority queue, the state S having a priority of L(S).

(2) Extraction from Queue—The state at the head of the priority queue is extracted, this state initially being the set of all segmentations S. The state is removed from the queue. If the extracted state is a terminal state, the process is halted and the state is output as the solution to the optimization process. Otherwise, the process continues.

(3) Insertion into Queue—For a set S that has been extracted from the queue, sets of segmentations are produced by the refining function R, $R(S) = \{S_1, S_2, \ldots, S_k\}$, with the corresponding priorities $L(S_1), L(S_2), \ldots L(S_k)$. The sets of segmentations that are produced are inserted in the priority queue in the order of the priority of each set.

(4) Iteration—The process returns to (2) Extraction from Queue to address the set of segmentations that is now at the head of the queue.

Under an embodiment of the invention, the optimization process divides the possible segmentations of an image into sets. The process evaluates upper bounds for each of the sets, this being done with the priority function L. The set with the highest, or most promising, bound goes to the top of the queue, and is then divided into smaller sets and the bounds are then refined. By keeping track of the sets and the associated bounds, it is then possible to identify the best segmentation of the image, and thus the best model for the structure that is present in the image.

Figure 4:
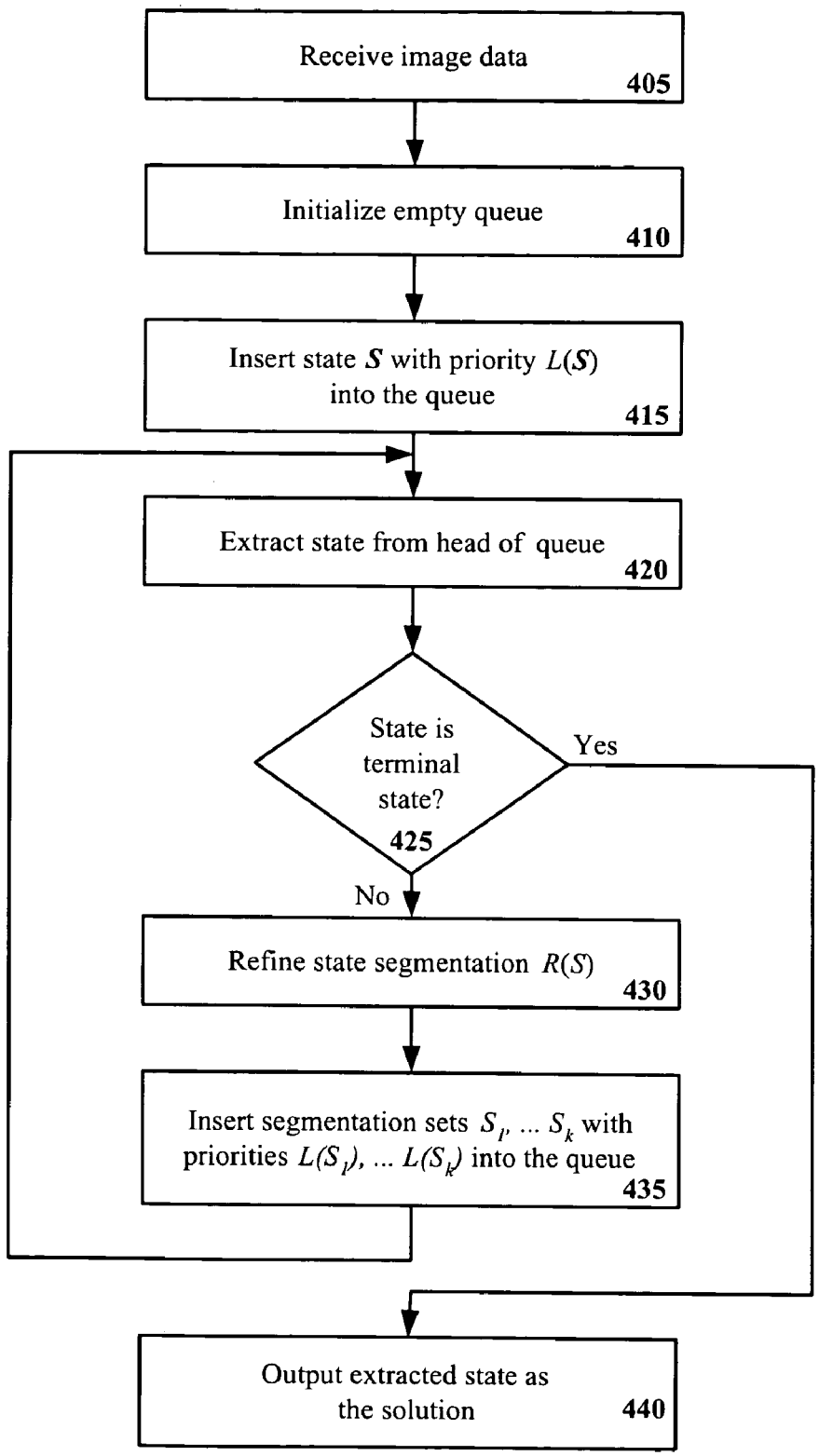
FIG. 4 is a flow chart to illustrate an embodiment of image segmentation.

FIG. 4 is a flowchart to illustrate an embodiment of image segmentation. In this illustration, image data is received 405. For example, the image data may represent the light intensity recorded by each pixel in an array of pixels. The image may be of a structure, such as, for one example, a wire structure of a microelectronic device. An empty priority queue is initialized 410, and into such queue is inserted the set of all segmentations S of the image 415. The segmentations are based on models of the structure, such as geometric models of expected wiring structures for a microelectronic device. The priority queue is arranged in order of priority, thus with the most promising segmentations at the head of the queue.

The state at the head of the priority queue is extracted 420. There is a determination whether the state is a terminal state 425, thus a question whether a particular standard has been reached that would terminate the search for segmentations. If the state is a terminal state, the extracted state is output at the solution to the process, the state representing the resulting segmentation of the image. If the state is not a terminal state, then the state is refined 430, producing a set of segmentation sets with a greater degree of refinement. The resulting segmentation sets, each having its own priority, are then inserted into the priority queue in order of priority 435. The process then continues iteratively, returning to the extraction of the state from the head of the queue 420.

Figure 5:
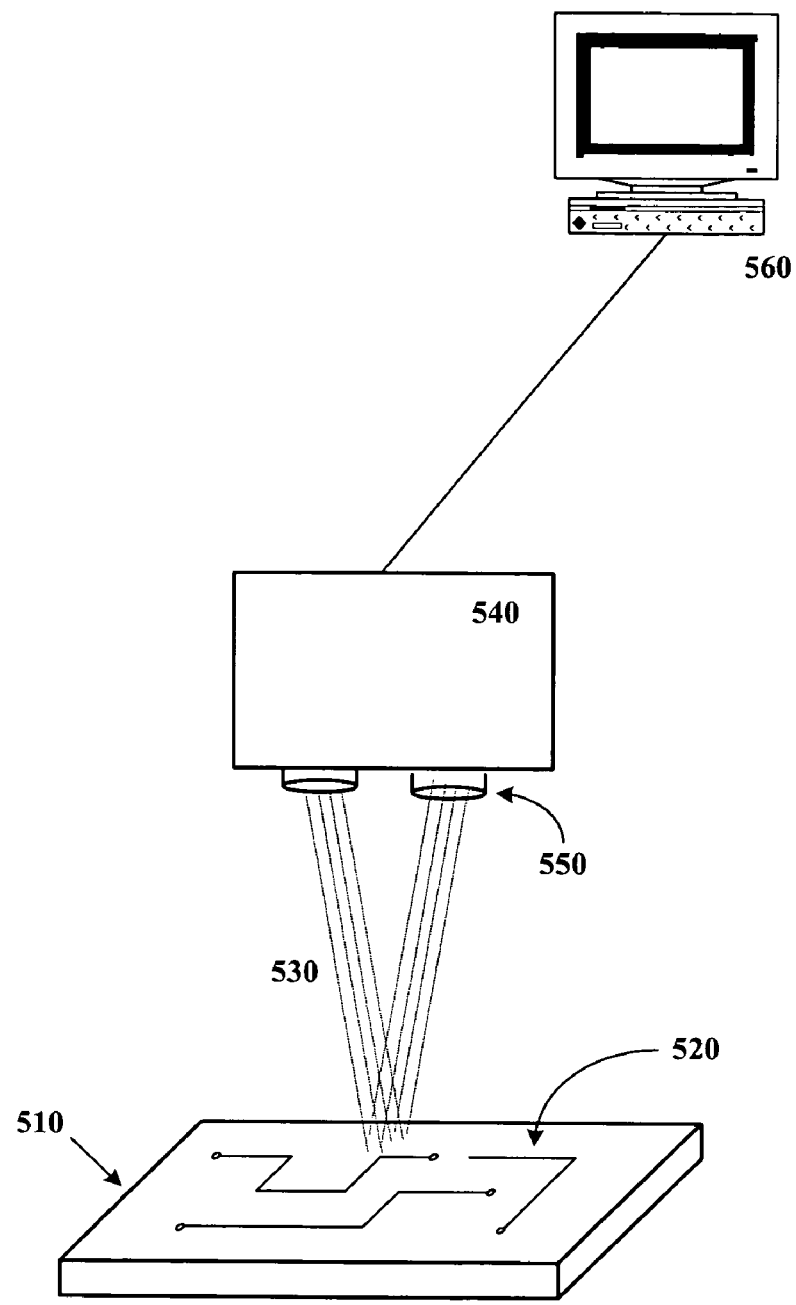
FIG. 5 illustrates an embodiment of an imaging environment.

FIG. 5 illustrates an embodiment of an imaging environment. FIG. 5 is a simplified drawing for purposes of explanation and is not intended to include all parts of an imaging system or to illustrate the parts in relative scale. In this example, the subject of imaging is a microelectronic device 510, which may include a processor or another electronic device. The microelectronic device 510 includes a number of traces 520. Under an embodiment of the invention, a focused ion beam (FIB) tool 540 directs a beam of ions 530 on the microelectronic device 510 and receives an image of the device under test with an image receptor 550. Other embodiments of the invention may be implemented with different types of imaging devices. The focused ion beam tool 540 may produce an image of the microelectronic device 510 for purposes of, for example, analysis and debugging operations. However, the structure of the microelectronic device 510 may be extremely tiny, and, as a result, the level of noise in images may be very high in relation to the actual image. The high level of noise may make it difficult to recognize and evaluate the device under test. Under an embodiment of the invention, the focused ion beam tool 540 may utilize automatic recognition of nano-structures using image segmentation and a branch and bound technique to recognize structures based on certain models of structures in the microelectronic device 510. Under an embodiment of the invention, data from the focused ion beam tool 540 may directed to a computer or other processing device 560 for processing. Under another embodiment of the invention, the focused ion beam tool 540 may include the processing means in a system. Under an embodiment of the invention, the focused ion beam tool 540 may use the recognition of nano-structures to support automatic operation of the tool, thereby allowing the tool to follow the structure of the wiring of the device under test without requiring a human to interpret the images that are received.

Figure 6:
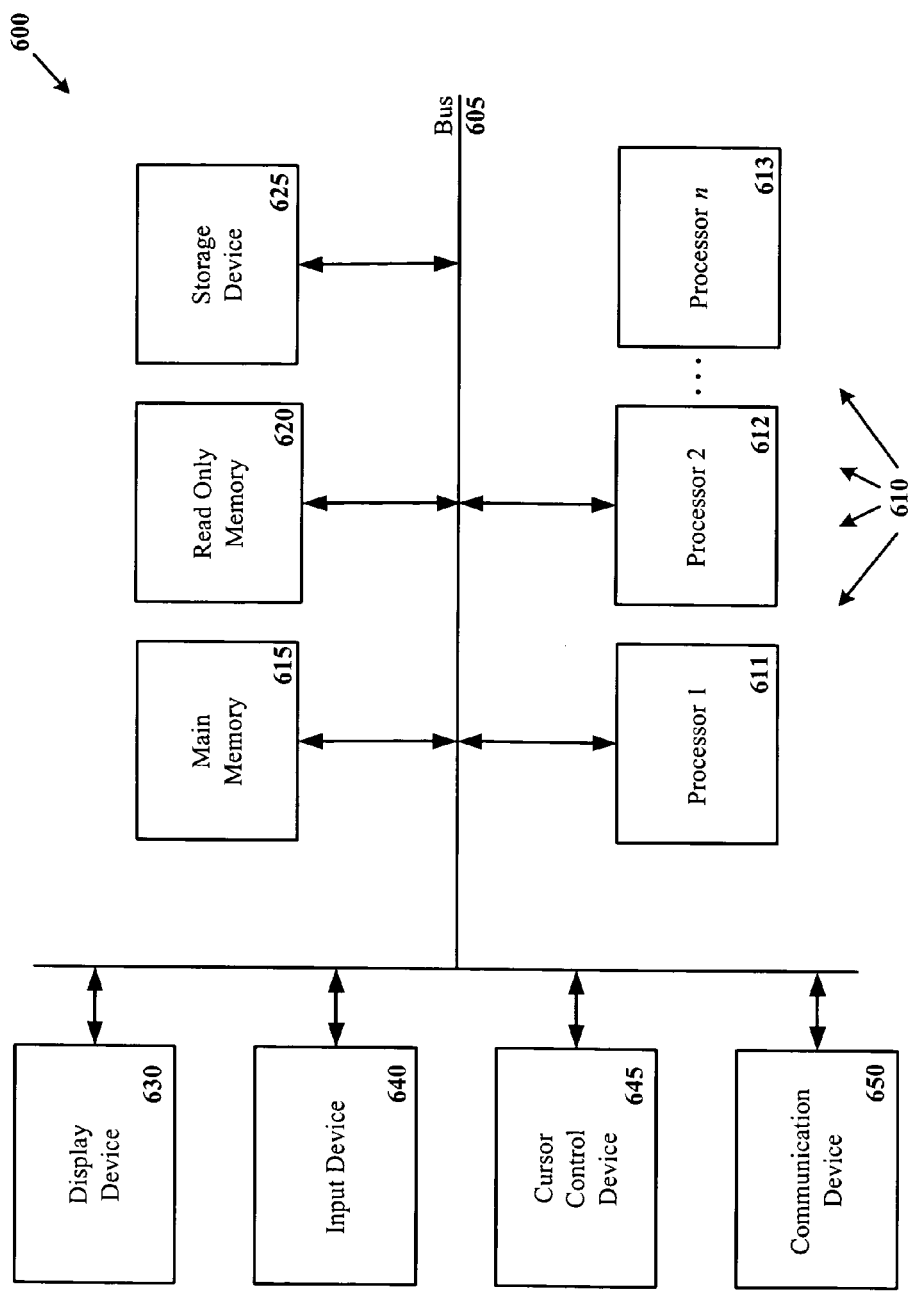
FIG. 6 is an illustration of a computer that may be used in image processing according to an embodiment of the invention.

FIG. 6 is an illustration of a computer that may be used in image processing according to an embodiment of the invention. Under an embodiment of the invention, a computer 600 comprises a bus 605 or other communication means for communicating information, and a processing means such as one or more processors 610 (shown as 611, 612, and continuing through 612) coupled with the bus 605 for processing information. The information processed may include image data, including images of nano-structures. The image data may be processed to interpret such data.

The computer 600 further comprises a random access memory (RAM) or other dynamic storage device as a main memory 615 for storing information and instructions to be executed by the processors 610. Main memory 615 also may be used for storing temporary variables or other intermediate information during execution of instructions by the processors 610. The computer 600 also may comprise a read only memory (ROM) 620 and/or other static storage device for storing static information and instructions for the processor 610.

A data storage device 625 may also be coupled to the bus 605 of the computer 600 for storing information and instructions. The data storage device 625 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 630, such as a liquid crystal display (LCD) or other display technology, for displaying information to an end user. In some environments, the display device may be a touch-screen that is also utilized as at least a part of an input device. In some environments, display device 630 may be or may include an auditory device, such as a speaker for providing auditory information. An input device 640 may be coupled to the bus 605 for communicating information and/or command selections to the processor 610. In various implementations, input device 640 may be a keyboard, a keypad, a touch-screen and stylus, a voice-activated system, or other input device, or combinations of such devices. Another type of user input device that may be included is a cursor control device 645, such as a mouse, a trackball, or cursor direction keys for communicating direction information and command selections to processor 610 and for controlling cursor movement on display device 630.

A communication device 650 may also be coupled to the bus 605. Depending upon the particular implementation, the communication device 650 may include a transceiver, a wireless modem, a network interface card, or other interface device. The computer 600 may be linked to a network or to other devices using the communication device 650, which may include links to the Internet, a local area network, or another environment. In an embodiment of the invention, the communication device 650 may provide a link to a service provider over a network. Under an embodiment of the invention, the communications device 650 may be utilized to receive image data for processing.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A computer-implemented method comprising:
    inserting a state into a queue, wherein a state comprises a set of image segmentations and has a priority representing a bound for a quality of each of its image segmentations, and wherein states in the queue are ordered by their respective priority;
    iteratively repeating the following:
        extracting the state in the queue having the highest priority;
        if the extracted state is a terminal state:
            halting and outputting the extracted state as a solution;
        if the extracted state is not a terminal state:
            refining the extracted state into a plurality of states;
            determining the priority of each of the plurality of states; and
            inserting the plurality of states into the queue.

2. The method of claim 1, further comprising identifying a structure in the image based on the solution.

3. The method of claim 2, wherein the image is an image of a portion of a microelectronic device.

4. The method of claim 3, wherein the structure comprises a wire structure in the microelectronic device.

5. The method of claim 1, wherein an extracted state is a terminal state if the set of segmentations for the state meets a precision standard.

6. The method of claim 1, wherein refining an extracted state comprises producing a set of segmentation sets that form a partition of the extracted state.

7. The method of claim 1, wherein the segmentations of the image are based on one or more geometric models.

8. The method of claim 7, wherein the one or more geometric models represent one or more expected structures in the image.

9. The method of claim 1, wherein the quality represents relative intensity of light on pixels of the image.

10. An imaging system comprising:
    an imaging device, the imaging device to receive an image of a device under test; and
    a processing system, the processing system to identify a structure in the image by evaluating one or more sets of segmentations of the image in relation to one or more models of expected structures, wherein evaluating comprises:
        inserting a state into a queue, wherein a state comprises a set of image segmentations and has a priority representing a bound for a quality of each of its image segmentations, and wherein states in the queue are ordered by their respective priority;

iteratively repeating the following:
  extracting the state in the queue having the highest priority;
  if the extracted state meets a standard of precision:
    halting and outputting the extracted state as a solution;
  if the extracted state does not meet the standard of precision:
    refining the extracted state into a plurality of states;
    determining the priority of each of the plurality of states; and
    inserting the plurality of states into the queue.

11. The imaging system of claim 10, wherein the operation of the imaging device is directed automatically based on identification of the structure.

12. The imaging system of claim 10, wherein the structure comprises a nano-structure.

13. The imaging system of claim 10, wherein the device under test comprises a microelectronic device.

14. The imaging system of claim 13, wherein the structure comprises a wiring structure in the microelectronic device.

15. The imaging system of claim 14, wherein the one or more models comprise one or more geometric models of expected wiring structures.

16. The imaging system of claim 13, wherein the imaging system is utilized to analyze the microelectronic device.

17. The imaging system of claim 10, wherein the quality for a segmentation comprises light intensity homogeneity for the segmentation.

18. The imaging system of claim 10, further comprising a focused ion beam tool.

19. An article of manufacture comprising:
  a machine-readable storage medium storing computer-executable instructions that, when executed by a computer, cause the computer to perform operations comprising:
    inserting a state into a queue, wherein a state comprises a set of image segmentations and has a priority representing a bound for a quality of each of its image segmentations, and wherein states in the queue are ordered by their respective priority;
    iteratively repeating the following:
      extracting the state in the queue having the highest priority;
      if the extracted state is a terminal state:
        halting and outputting the extracted state as a solution;
      if the extracted state is not a terminal state:
        refining the extracted state into a plurality of states;
        determining the priority of each of the plurality of states; and
        inserting the plurality of states into the queue.

20. The article of manufacture of claim 19, further comprising computer-executable instructions that, when executed by the computer, cause the computer to perform operations comprising identifying a structure in the image based on the solution.

21. The article of manufacture of claim 19, wherein refining an extracted state comprises producing a set of states that form a partition of the extracted state.

22. The article of manufacture of claim 19, wherein the image segmentations in a state are based on one or more geometric models.

23. The article of manufacture of claim 22, wherein the one or more geometric models represent one or more expected structures in the image.

24. The article of manufacture of claim 19, further comprising computer-executable instructions that, when executed by the computer, cause the computer to perform operations comprising evaluating the quality of a segmentation of the image based on intensity of light falling on pixels of the image.

* * * * *